Jan. 22, 1924.
M. BRABAW
1,481,454
WEED AND STUBBLE CLEARER FOR PLOWS
Filed March 9, 1922
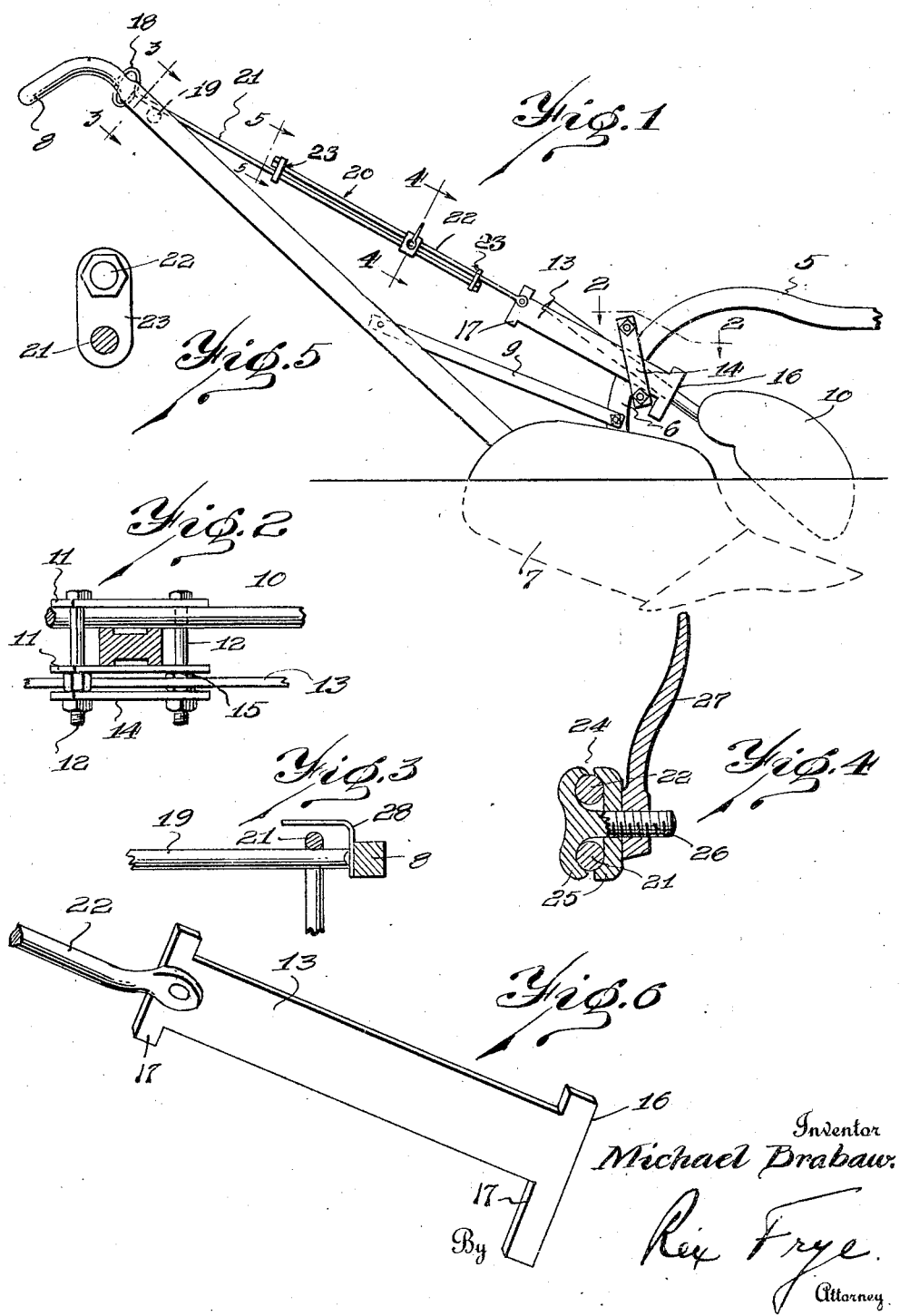
Inventor
Michael Brabaw.
By Rex Frye.
Attorney Patented Jan. 22, 1924.

1,481,454

UNITED STATES PATENT OFFICE.

MICHAEL BRABAW, OF PEARL BEACH, MICHIGAN.

WEED AND STUBBLE CLEARER FOR PLOWS.

Application filed March 9, 1922. Serial No. 542,202.

*To all whom it may concern:*

Be it known that I, MICHAEL BRABAW, a citizen of the United States, and residing at Pearl Beach, county of St. Clair, and State of Michigan, have invented new and Improved Weed and Stubble Clearers for Plows, of which the following is a specification.

This invention relates to improvements in weed and stubble clearers for plows, and has for its principal object to provide means for quickly and efficiently clearing any accumulation of weeds or other débris adjacent the plow, and which can be operated by the plowman without stopping the team or tractor drawing the plow.

It has long been a desideratum among plow manufacturers and operators to overcome the accumulation and piling up of weeds, stubble, manure, etc., in proximity to the plow, for such accumulation not only has the effect of gradually raising the plowshare from the ground and so making it impossible to turn the soil to a sufficient depth, but also required the loss of considerable time on the part of the plowman because of the stoppage of the entire gang whenever it is necessary to clear the débris from any of the plows. My improved weed clearer will overcome these objectionable features and provides a readily accessible clearing member adapted to be swung, thrust or pulled by the plowman so as to remove any débris adjacent the plow.

Other objects and advantages of my invention will be apparent from the following description wherein reference is made to the accompanying drawings illustrating a preferred embodiment of my invention, and wherein similar reference numerals designate similar parts throughout the several views.

In the drawings:—

Fig. 1 is a side elevation of a plow with my improved weed clearer in position thereon;

Figs. 2, 3, 4 and 5 are detail sections taken substantially on the lines 2—2, 3—3, 4—4 and 5—5 respectively of Fig. 1, and Fig. 6 is a detail perspective view of the blade portion of my weed clearer.

Referring now to the drawings the numeral 5 designates the plow beam which as herein shown is of the conventional type having a vertical portion 6 directly in the rear of the plowshare 7 and a horizontal portion to which connection is made to a tractor or team whereby the plow is drawn. The handles 8 may be secured to the beam 5 in any desired manner and are preferably braced by means of straps 9 substantially as shown. My weed and stubble clearer is adapted to be supported upon the beam 5 and comprises a colter 10 secured upon the beam 5 by means of a pair of clamp brackets 11 whereby the colter may be adjusted to any desired height and location and then clamped to maintain it in the desired position. The clamp brackets are secured together by spaced bolts 12 arranged above and below the beam which bolts are of a sufficient length to extend beyond the brackets.

A blade member 13 is preferably secured upon the plow beam by the same bolts 12 of the clamp bracket, though it is to be understood that such construction is optional and a separate pair of clamp brackets may be utilized whenever desired. As herein shown, the blade portion 13 passes between the upper and lower bolts 12, and the inner clamp bracket 11 of the colter clamp and a similar bracket 14 adapted to be secured upon the bolts 12 inside of said inner bracket. The nuts holding the brackets 11 or similar spacing means are provided between the bracket 14 and the inner bracket 11 to provide ample room for the ready passage of the blade 13 while at the same time enabling the turning down of the nuts 15 so as to firmly hold the colter. The blade 13 extends vertically between the upper and lower bolts 12 and is of slightly less height than the distance between such bolts so as to permit of the free movement of the blade within the clamp and the rocking of the blade upon the lower bolt when it is desired to raise or lower the clearing edge 16 thereof. At either end of the blade portion 13 I provide stop members 17 to limit the stroke and prevent the accidental removal of the blade from the plow. A handle 18 is arranged to normally rest upon a rung 19 of the plow handles in position to be easily grasped by the plowman, and is connected with the blade portion 13 through an adjustable intermediate portion 20 by means of which my weed clearer can be quickly adjusted to fit any plow and be used with any colter whether rolling or stationary. The particular adjustment shown comprises extensible bars 21 and 22 on the blade and handle portions respectively, and each carrying laterally extending members 23 through which the other passes so as to maintain the bars in parallel relation, a clamp 24 comprising spaced clamp members 25 engaging each of the bars 21 and 22, and adapted to be connected by a bolt 26. When the wing nut 27 of the bolt 26 is loosened the handle and blade portions may be moved toward or away from each other at will, and then by tightening the wing nut 27 the members are firmly held at any desired adjustment.

The operation of my weed and stubble clearer is believed to be apparent. The colter 10 is adjusted to its desired position above the plowshare 7 in the usual way and the blade 13 positioned between the bracket members so as to be readily moved by the plowman into the space between the colter and the plow share or the colter and the beam whenever it is desired to remove any débris that may have accumulated in such spaces. The removal of débris may be accomplished by thrusting the blade from its normal position in rear of the colter to and through such space or spaces, or by pulling the blade from an extreme forward position rearwardly so that the forward stop member 17 will hook the débris from between the share and colter and deposit it at the side of the plow. The removal of congested débris may also be accomplished by swinging the clearing edge of the blade by a lateral motion of the handle to bring the clearing edge either into the space between the share and colter or against the colter with a sharp impact so as to jar loose any débris that may be sticking upon the colter.

To prevent the handle from falling when the plow is turned at the end of the furrow, I preferably provide a bracket 28 to engage the upper side of the handle bar 21 and secure it between the bracket and the upper side of the rung. This bracket may be made of iron or any desired material.

While it will be apparent that the illustrated enbodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim:—

1. A weed and stubble clearer for plows comprising a colter a blade portion arranged adjacent the colter, a handle portion and adjustable intermediate members whereby the handle may be positioned adjacent the plow handles, a clamp for securing the intermediate members in any adjusted position, a bracket for retaining the blade portion upon the plow beam, and stop members at either end of the blade portion to limit the thrust thereof.

2. A weed and stubble clearer for plows comprising a colter, a bracket for adjustably mounting the colter upon the plow, a blade normally resting upon said bracket above the colter and carrying stop members adapted to engage the bracket to limit the extent of movement of the blade, and a handle extending from the blade to the plow handles.

In witness whereof I hereunto set my hand.

MICHAEL BRABAW.

Witnesses.
REX FRYE,
JOHN C. ALEXANDER.